Oct. 11, 1955 R. F. HAYS, JR 2,720,643
RADIO SCANNING APPARATUS
Filed Jan. 19, 1946 2 Sheets-Sheet 1

INVENTOR
ROBERT F. HAYS, JR.
BY *Paul B. Hunter*
ATTORNEY

Oct. 11, 1955  R. F. HAYS, JR  2,720,643
RADIO SCANNING APPARATUS
Filed Jan. 19, 1946  2 Sheets-Sheet 2

INVENTOR
ROBERT F. HAYS, JR.
BY Paul B. Hunter
ATTORNEY

ND Patented Oct. 11, 1955

United States Patent Office 2,720,643

2,720,643

RADIO SCANNING APPARATUS

Robert F. Hays, Jr., Syosset, N. Y., assignor to Sperry Rand Corporation, a corporation of Delaware Original application May 19, 1942, Serial No. 443,573. Divided and this application January 19, 1946, Serial No. 642,216

12 Claims. (Cl. 343—5)

The present invention relates generally to radar apparatus mountable on a movable craft and is more particularly concerned with radio scanning apparatus providing directional information concerning remote objects, which information is stabilized or corrected to compensate for rotational movement of the craft or modified for the purpose of facilitating alignment of the ground track of an aircraft with respect to a target.

The present application is a division of application Serial No. 443,573, filed May 19, 1942, in the name of Joseph J. Caldwell, Jr., entitled Object Detecting and Locating System. In the above-mentioned application, there is disclosed a radar system adapted to directively radiate ultra high frequency radio energy pulses in the form of a beam which is swept over a field of view. Objects within the field of view reflect pulses back to the system which derives video signals therefrom. An indicator converts the signals into images representing the objects on a screen. These images are positioned on the screen in one coordinate according to the time between transmission of pulses and the reception of echoes, that is, according to the slant ranges of the objects and in another coordinate according to the azimuth angles of the radio beam.

The present invention is directed primarily to these aspects of the apparatus which modify the positions of the images on the indicator screen in order that angular measurements may be determined with such precision with respect to stabilized spatial coordinates that in conjunction with a computer mechanism, known to the prior art, bombardment of optically obscured targets may be effected.

It is, therefore, an object of the present invention to provide radio scanning apparatus for deriving angular information concerning remote objects substantially unaffected by motion of the craft on which the apparatus is mounted.

Another object of the invention is to provide directional receiving apparatus from which angular data concerning sources of radio waves may be determined with reference to a fixed coordinate system.

Yet another object lies in the provision of radio apparatus for aligning the ground track of an aircraft relative to a target for bombing purposes.

Still another object is to provide a radiator assembly for scanning a remote object or target with a directive beam of electromagnetic radiation, said radiator assembly being stabilized about two substantially perpendicular axes against motion of the craft carrying the radiator assembly so that an indicator controlled therefrom may at all times disclose true angular data of the remote object with respect to predetermined spatial coordinates.

A further object of the invention is to provide image stabilizing means associated with a radio system of the type wherein signals are collected from remote objects by a directivity pattern which is orientatable about two mutually perpendicular axes and wherein images are produced from the signals and positioned on an indicating screen in accordance with the angle between the directivity pattern and one of the axes, the stabilizing means being adapted to substantially neutralize movements of the images resulting from angular displacements of the pattern about a third axis substantially perpendicular to the first two axes caused by rotational movements of the craft upon which the system is mounted.

Another object is to provide a radio apparatus for overcast bombardment of a target wherein a voltage substantially proportional to the angle subtended by the cross trail of a bomb is added to an azimuth sweep voltage in a cathode ray indicator so that a representation of the target on the indicator screen may be shifted to compensate for the cross trail effect on bombardment technique.

Other objects and advantages will become apparent from the specification, taken in connection with the accompanying drawings wherein one embodiment of the invention is illustrated.

The solution to bombing problem may be divided into two parts; means must be provided, first, for aligning the ground track of the bomber, and, second, for determining the range angle. The ground track is the path followed by the aircraft over the ground while the range angle forward of the true vertical at which the bomb must be released. In the prior art, a stabilized optical system provided the ground track alignment and a computer mechanism provided the range angle determination. Bombardment missions must be carried out under conditions of good visibility favoring anti-aircraft measures or under conditions of poor visibility when aim is uncertain and objectives may even entirely escape detection. The radio apparatus of the present invention fulfills the function of the stabilized optical system under visibility conditions which cause the latter to be ineffectual. The function of the computer mechanism remains unchanged.

Since it is an object of the present invention to align the ground track of an aircraft with respect to a target, certain aspects of bombardment technique affecting the fulfillment of this object should be mentioned. Under usual bombing conditions it is not sufficient merely to align the aircraft's ground track or route traveled over the ground so that it passes through the target. This is because air resistance acts on a bomb in flight to retard its initial air velocity and lengthen the time of fall, thus allowing a cross wind to blow it off its initial course. The drift angle of the bomb increases as its forward air speed decreases while the drift angle $\alpha$ of the aircraft remains constant; consequently the point of impact of the bomb lies downwind from the aircraft's ground track. The ground track, therefore, must be turned through an angle $\beta$ in order that it pass to windward of the target at a distance just sufficient to compensate for the curving course of the bomb.

Figure 1:
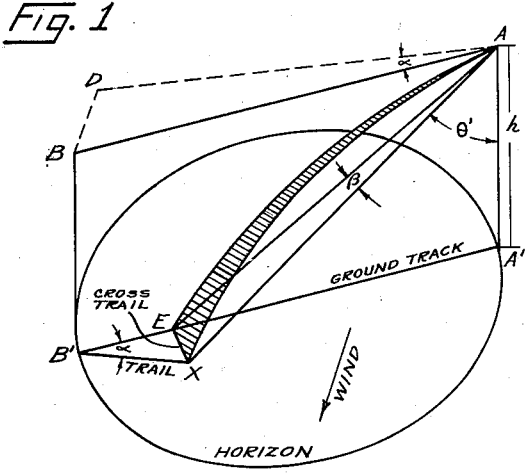
Fig. 1 is a perspective view illustrating factors affecting the alignment of an aircraft's ground track with respect to a target.
Figure 3:
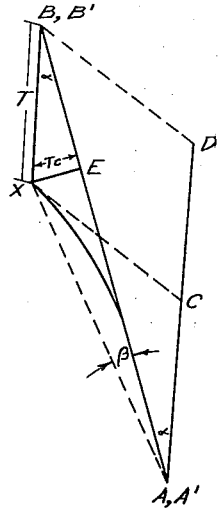
Fig. 3 is a projection of Fig. 1 upon the ground plane, showing the cross trail correction to the ground track.
Figure 2:
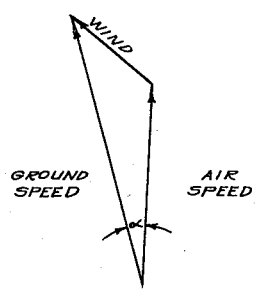
Fig. 2 is a vector diagram used for explaining the meaning of drift angle $a$.

The correction $\beta$ to the ground track may be more clearly understood by reference to Figs. 1 and 3. An aircraft at a point A flying at a constant altitude $h$ above a ground point A' is assumed to have a certain air speed and encounter a wind as indicated vectorially in Fig. 2. The vector resultant of the wind velocity and air speed is the ground speed lying at the drift angle $\alpha$ from the air speed vector. The aircraft therefore heads along the line ACD, the wind blows parallel to lines DB and CX, and the ground track is the line A'EB'. If a bomb is released at point A, the horizontal projection of its trajectory follows the curved line from A' to X, the point of impact, while the aircraft reaches point B directly above B' during the same interval. The horizontal distance B'X, which the bomb lags behind the aircraft during the time of fall, is termed trail T. Trail is a function of the ballistic coefficient (air resistance) of the bomb, the altitude (air density and time of fall), and air speed of the aircraft. Trail may be determined from empirical tables for the particular type of bomb used by referring to the value corresponding to the readings of the aircraft's altimeter and air speed indicator. Since the distance AC parallel to the aircraft's air speed vector is proportional to the average forward air speed vector of the bomb, and CX is parallel and equal to DB because the effect of the wind is assumed the same on both the bomb and the aircraft, then from elementary geometric considerations, the angle XB'E must be the drift angle $\alpha$. The distance XE equal to $T \sin \alpha$ is termed the cross trail $T_c$. The angle $\beta$ is the angle subtended by the cross trail from the release point A. The angle A'AX is termed the range angle $\theta'$ at which the bomb must be released to reach the target at X. This angle $\theta'$ is, therefore, a special case of the angle $\theta$ which is termed the sighting angle. It will be seen that:

$$\tan \beta = \frac{T}{h} \sin \alpha \cos \theta' \qquad (1)$$

where $\beta$ is the angular correction to the ground track, T is the trail distance, $h$ is the altitude, $\alpha$ is the drift angle, and $\theta'$ is the range angle. The angle $\beta$ is always small, consequently Equation 1 may be rewritten with insignificant error as:

$$\beta = \frac{T}{h} \sin \alpha \cos \theta' \qquad (2)$$

Figure 6:
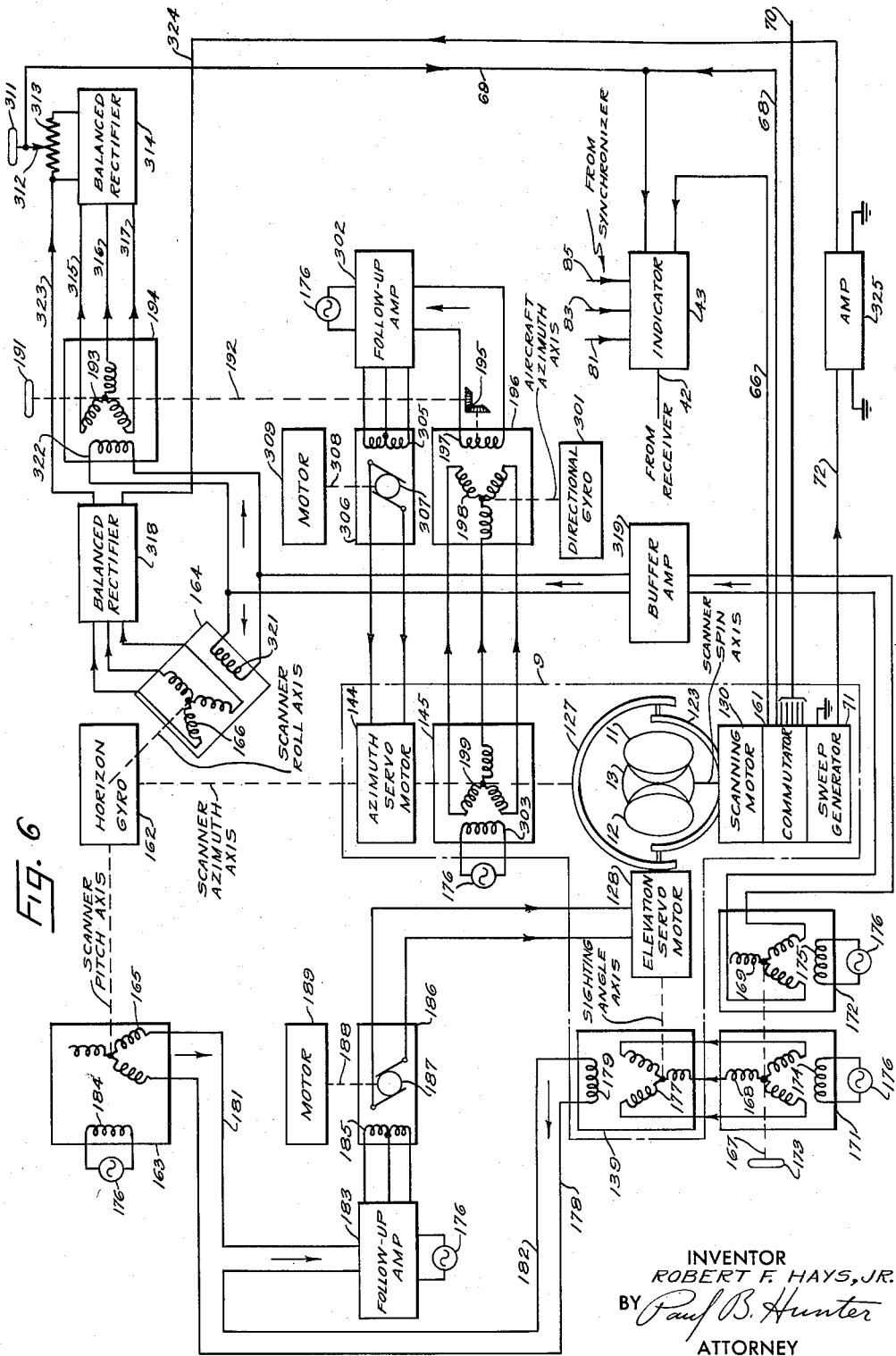
Fig. 6 is a schematic diagram illustrating scanner stabilization and azimuth correction circuits forming the subject matter of the present invention.

In the present invention this correction is applied by electrical means as disclosed with reference to Fig. 6.

Figure 4:
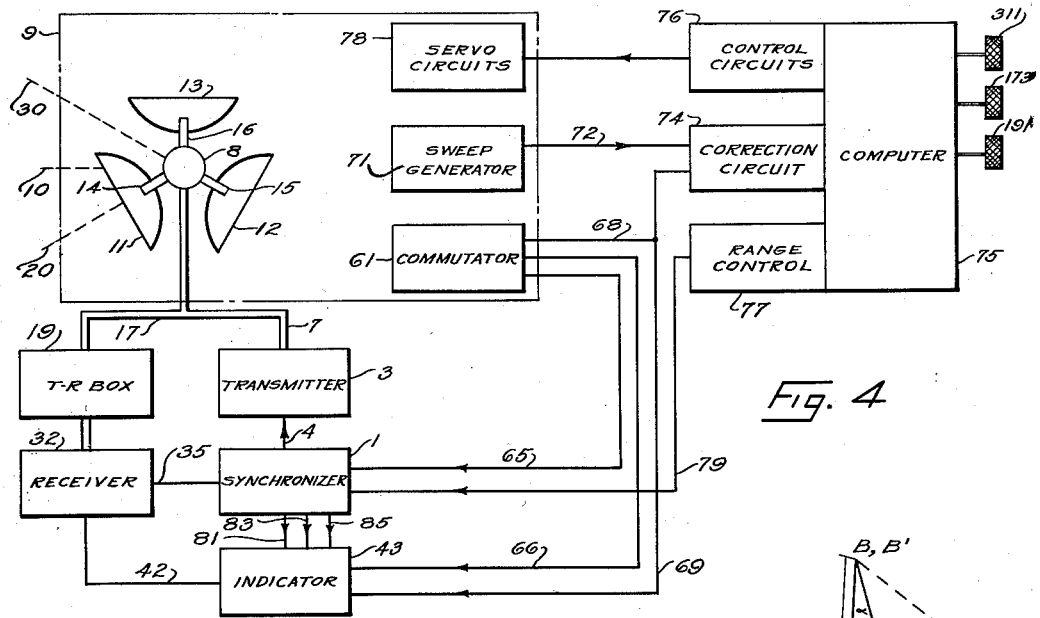
Fig. 4 is a block diagram of a radar system embodying the present invention.

Referring now to Fig. 4, there is shown a radar system which is particularly adapted to be employed in conjunction with a bombsight computer. A synchronizer 1 contains a source of stable frequency from which a plurality of periodic control pulses are derived. The pulses formed by the use of well-known wave-forming circuits have different shapes and magnitudes according to the requirements of the circuits controlled, but these pulses have a common time reference because of their common origin. The synchronizer 1 is connected to a pulse transmitter 3 for controlling the repetition rate and operating sequence of the same. A wave guide 7 is provided from the transmitter 3 to a wave guide valve 8 in a scanner assembly 9.

The scanner assembly 9 is designed to furnish a mounting for a scanner having three degrees of freedom. The scanner comprises three directive reflectors 11, 12, and 13 rotatable as a unit at a substantially constant spin frequency about an axis passing through the center of the valve 8 and perpendicular to the plane of the figure. The spin axis can itself be turned clockwise or counterclockwise independently of the spin frequency about a concentric azimuth axis to determine the azimuth direction of a stabilized sighting line 10. The third degree of freedom allows the scanner to be turned around a sighting angle or pitch axis perpendicular to the sighting line 10 and to the spin and azimuth axes to determine the elevation of this sighting line. The reflectors 11, 12 and 13 forming the rotating portion of the scanner assembly 9 may be either cylindrical parabolas or paraboloids, each being furnished with an open-ended wave guide 14, 15 and 16 respectively, having one end substantially at the focus of the associated reflector and the other end abutting valve 8. Upon rotation of the reflectors about the valve 8, the wave guide 7 is connected in succession to guides 14, 15 and 16.

Suppose for example, that the scanner rotation is clockwise, then a dashed line 20 represents the direction in which the axis of each reflector points when its associated wave guide is connected to guide 7. The connection is maintained until the axis of the reflector in question points along a dashed-line 30. The reference heading of the scanner assembly or the sighting line about which the assembly is stabilized is represented by line 10 bisecting the angle between lines 20 and 30.

Fig. 4 illustrates reflector 11 at the commencement of its period of utilization. After reflector 11 has turned to the direction of line 30, there is an interval during which all wave guides are disconnected until the axis of the succeeding reflector 12 reaches the line 20 and a new period of transmission begins.

The operation of transmitter 3 is controlled by a commutator 61 mounted in the scanner assembly 9 and arranged to rotate at the scanning frequency, that is, at three times the speed at which reflectors 11, 12 and 13 are rotated. For this purpose, commutator 61 is connected by a lead 65 to synchronizer 1 and permits trigger pulses to be generated only during times when the valve 8 connects the wave guide 7 to either wave guide 14, 15 or 16.

A receiving wave guide 17 is connected to guide 7 for passing reflected energy from the scanner assembly 9 to a receiver 32 during the intervals between the successive pulses generated by the transmitter 3. A limiter or T—R box 19 is interposed in the wave guide 17. This device, known to the art, consists of a gas-filled resonant chamber containing electrodes maintained at such relative potentials as to keep the gas close to the ionization condition. The device 19 is adapted to discharge when strongly excited and thus, effectively damp the exciting oscillations. The placement of the T—R box 19 relative to the junction of wave guides 7 and 17 is such as to reflect a very high impedance at this point when the discharge effectively shorts the resonant chamber.

Receiver 32 may be of a conventional design containing a mixer, local oscillator, intermediate frequency amplifier, detector and video frequency amplifier. A lead 35 interconnects the synchronizer 1 with the receiver 32 for the purpose of blanking or desensitizing the receiver momentarily when the transmitter 3 emits a pulse. The output of the receiver is fed over the lead 42 to an indicator 43.

The indicator 43 is arranged to provide a pattern on a cathode ray oscilloscope screen traced by an electron beam whose intensity is proportional to the signals received over lead 42. Time-sweep signals are provided from the synchronizer 1 over lead 81 to displace the beam vertically after the radiation of each pulse from the transmitter in order that the image resulting from an echo signal be positioned in accordance with the slant range of the reflecting object.

Horizontal beam displacement in the indicator 43 is provided by signals from a sweep generator 71 through a sweep correction circuit 74 over a lead 69. The sweep generator 71 is mounted in the scanner assembly 9 and is driven synchronously with the commutator 61. A lead 72 places the output circuit of generator 71 in series with the sweep correction circuit 74 associated with a computer 75 to introduce corrections and modifications in the sweep signal for stabilizing the directional signal against certain rotational movements of the craft mounting the equipment and also for the purpose of facilitating alignment of the ground track of the craft with respect to a target, as is more fully discussed with reference to Fig. 6.

Lead 83 from the synchronizer 1 furnishes an intensifying pulse for the purpose of turning on the electron beam of indicator 48 only during periods of reception of useable signals.

An azimuth reference reference trace is produced on the screen of the indicator 43 to represent the heading of the sighting line 10. Since the signal from the sweep generator 71 passes through zero as the scanner sweeps past this reference heading, the azimuth sweep signal may be conveniently grounded to obtain a stabilized sighting line reference. Lead 69 is shorted by a segment of the commutator 61 to which it is connected by lead 68 during the periods between the discontinuance of transmission from one and before the utilization of the succeeding reflector. This period is during the absence of intensifier pulses so that the electron beam must be made visible by another means. This is accomplished by employing a lead 66 connecting another segment of commutator 61 with the beam intensity control circuit of the indicator 43 and serving to intensify the electron beam. The time sweep operates continuously and draws a vertical line on the screen of indicator 43 corresponding to the heading of the stabilized sight line. This heading is controlled by a drift angle knob 191 associated with the computer 75. Control circuits 76 cause servocircuits 78 in the scanner assembly 9 to rotate the mounting supporting the reflectors 11, 12, and 13 about a normally vertical axis in response to manipulation of knob 191.

In order to measure accurately the slant range of objects whose images appear on the screen of indicator 43, slant range reference pulses are provided by synchronizer 1 over lead 85. These pulses may be adjustably delayed a precise and known interval with respect to the transmitted pulses, and are added to the echo signals supplied over lead 42 to control the intensity of the indicating beam. On every vertical sweep of the electron beam in indicator 43, the slant range reference pulse will appear as an intensification of the beam. These reference spots form a continuous horizontal trace as the azimuth sweep signals from generator 71 deflect the beam horizontally at a much slower speed.

The distance to a particular object is determined by so delaying the reference pulses that the slant range reference trace appears on the screen of the indicator 43 at the same height as the image corresponding to the selected object. This superposition of the slant range reference trace on the image in question is accomplished by manipulation of a sighting angle knob 173 associated with the computer 75. A range control circuit 77 coupled to computer 75 coordinates the position of the sighting angle knob 173 with the delay circuit in the synchronizer 1 which produces the slant range reference pulses.

The computer mechanism 75 is not limited to any specific embodiment, but it may be, for example, of the general type disclosed in U. S. Patent No. 2,162,698, issued June 20, 1939, in the names of Earl W. Chaffee and Hugh Murtagh. The computer's task is to determine the range angle $\theta'$, that sighting angle at which a bomb must be released from an aircraft, flying a properly aligned ground track, to strike a desired target. This range angle is a function of altitude, time of fall, trail, and ground speed which factors must be supplied to the computer to enable it to accomplish it purpose. Once the ground track has been aligned as has been previously discussed with reference to Figs. 1 to 3, the necessary factors with the exception of ground speed may be predetermined by auxiliary means such as tables and set into the computer manually. Ground speed is determined by the generally known synchronous method. Rate of change of sighting angle is used by computer 75 in combination with the known altitude of the aircraft to compute the horizontal velocity with which the aircraft is approaching the target.

Under conditions of poor visibility, sighting angle and ground speed measurement must be obtained indirectly from the slant range determination of indicator 43, since the angular width of the scanning beam emitted by the scanner assembly 9 is too broad in the vertical plane to provide a determination of the sighting angle, based upon the direction of the beam's principal axis, sufficiently accurate for bombing purposes. As a result of the azimuth angle vs. slant range type of indication provided by the present radio apparatus in contrast to the purely angular information obtained from the optical sighting device normally associated with the computer 75, the actual elevation angle of the scanning beam is immaterial as long as the target is irradiated with sufficient energy to cause an image to appear on the indicating screen. The range control 77 is provided to convert from the circuits in the synchronizer 1, producing the slant range reference trace, to the ground speed mechanism in the computer.

Figure 5:
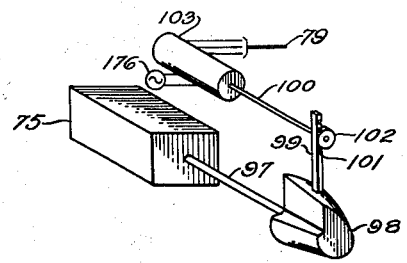
Fig. 5 is a perspective view of a range control for converting between angular data employed by a bombsight computer and distance determinations provided by the radar system.

The range control 77 seen in detail in Fig. 5 is associated with the ground speed shaft 97 of the computer 75, which is given by the computer mechanism an angular adjustment proportional to $$\tan \theta \text{ or } \frac{R}{h}$$

where R is the horizontal range to a target, $h$ is the altitude, and $\theta$ is the sighting angle. The altitude adjustment is manually introduced into the computer according to the indications of either a sensitive altimeter or the actual ground clearance corresponding to the slant range revealed by the indicator 43 of the terrain immediately below the aircraft. The usual displacement and rate control knobs associated with the computer 75 permit adjustment by the bombardier of the magnitude and time rate of change of R to such values that because of the functional relationship between R and $R_s$, the slant range reference trace can readily be superimposed on the target image on the indicator screens and their respective movements synchronized. The necessary functional interconnection which enables $R_s$ to be regulated by the conventional computer controls $h$ and R is now discussed.

Attached to the shaft 97 in the range control is a three-dimensional cam 98 shaped to displace a cam follower 99 radially a distance proportional to the cosecant of the sighting angle when rotated. The cam may be translated along the axis of the shaft according to the altitude setting of the computer. The longitudinal section of the cam has a linear slope such that the cam follower is displaced radially a distance proportional to the altitude. Since the angular adjustment of the cam is proportional to $$\frac{R}{h}$$

and the displacement of the cam follower with respect to the cam is proportional to $$\frac{h}{\sin \theta}$$

the effective lift of the cam follower is proportional to $$\frac{R}{\sin \theta}$$

or the slant range $R_s$. The cam follower 99 is attached to a rack 101 which drives a pinion 102 on the shaft 100 of a self-synchronous transmitter 103. The transmitter rotor winding is connected through a cable 79 to the synchronizer 1 while the stator is energized from an alternating current source 176. A self synchronous receiver is synchronizer 1 reproduces angular position of shaft 100 and controls the delay of the slant range reference pulses relative to the transmitted pulses. For every setting of sighting angle there will be a corresponding slant range position transmitted to the synchronizer 1 by the range control 77, and represented on the indicators by a slant range reference trace.

The electron beam sweeping over the screen of indicator 43 forms a navigational picture covering perhaps 60° of azimuth angle and perhaps 15 miles of slant range. When to conserve transmitter power club-shaped scanning beams are employed only a horizontal strip on the screen of the indicator 43 is utilized at a time. If the beam is very narrow the height of this strip in distance approximately equals the slant range corresponding to the position of the reference trace multiplied by the product of the beam angle in radians and the tangent of the sighting angle as measured from the vertical upwards. The pattern height therefore increases rapidly as the sighting line 10 is raised towards the horizon.

When it is desired to track an image on the screen of indicator 43 representing a target, the control circuits 76 are used to cause azimuthal rotation of the scanner assembly 9 through the action of the servo circuit 78 so that the stabilized sighting line 10 as represented by the azimuth reference trace lies vertically through the middle of the target image. The control circuits 76 may also be used to angularly adjust the reflectors 11, 12 and 13 in elevation through the operation of the servo circuit 78 in order that the stabilized sighting line 10 assume a sighting angle corresponding to the value of the slant range reference trace when the latter horizontally bisects the target image.

In a technique, well known to pilots, the aircraft carrying the apparatus of the present invention may be headed in such a direction that the target when split by the azimuth reference trace moves down the indicator screen without deviating to the right or left of the trace. Under these conditions it seems evident that the ground track or route over the ground will carry the aircraft directly above the target. If now the slant range reference trace is synchronized by adjusting the speed of the computer's ground speed shaft which drives the range control 77 so that the trace travels down the screen in superposition with the target, the speed of closing with the object is given by the computer setting. Trail correction, previously mentioned, is introduced into the computer by a knob 311, as discussed with reference to Fig. 6, the reference traces slightly readjusted, and when the sighting angle θ becomes $$\theta = \tan^{-1} \frac{\text{ground speed} \times \text{time of fall} - \text{trail}}{\text{altitude}} \quad (3)$$

the conditions for bomb release are attained.

Referring now to Fig. 6, there is illustrated schematically the functional relationship between the scanner assembly 9 and the control and correction circuits 76 and 74, respectively, shown in Fig. 4. The reflectors 11, 12 and 13, turnable about the scanner spin axis, are supported by a U-shaped frame 123 to which are attached a scanning motor 130, the commutator 61, and the sweep generator 71. The frame 123 turnable about the sighting angle axis, is supported by a yoke 127. An elevation servo motor 128 and an associated self-synchronous transmitter 139 are diagrammatically represented as mounted on the yoke 127 concentric with the sighting angle axis. The yoke 127 is turnable about the scanner azimuth axis by an azimuth servomotor 144 which, with an associated self-synchronous tramitter 145, is represented concentric with this axis. A horizon gyroscope 162, having self-synchronous transmitters 163 and 164 mounted thereon, is caused to follow the movement of the scanner assembly 9 in azimuth about the scanner azimuth axis. Thus oriented the horizon gyroscope 162 responds to the roll and pitch of the scanner in space rather than the roll and pitch of the aircraft. Transmitter 163 picks off pitch indications from the gyroscope 162 so that the axis passing through its rotor 165 may be defined as the scanner pitch axis. Transmitter 164 picks off roll indications from the gyroscope 162 so that the axis passing through its rotor 166 may be defined as the scanner roll axis.

A sighting angle shaft 167 serves as an axle for rotors 168 and 169 of self-synchronous transmitters 171 and 172, respectively. The shaft 167 may be angularly adjusted directly by the knob 173 or by an arc tangent cam actuated by shaft 97 in the computer mechanism. The stator windings 174 and 175 of transmitters 171 and 172, respectively, are excited by a common alternating current source 176. The three-phase rotors 177 and 168 of transmitters 139 and 1711, respectively, are electrically interconnected. A lead 178 from the stator winding 179 of transmitters 139 connects with the single phase rotor winding 165 of the transmitter 163. A lead 181 from the rotor 165 and a lead 182 from the other end of the staator winding 179 feed the input circuit of a follow-up amplifier 183. The alternating current source 176 supplies a phase reference voltage to the amplifier and excites the stator winding 184 of the transmitter 163. The amplifier 183 has a push-pull output load 185 which forms the center-tapped field winding of a direct current generator 186. The armature 187 of the generator 186 is rotated through a shaft 188 by a motor 189. The output of the armature supplies the power for the elevation servo motor 128, whose field may be separately excited.

The drift angle knob 191 which may be mounted in the computer mechanism turns a shaft 192 on which is mounted the rotor 193 of a self-synchronous transmitter 194. The shaft 192 is connected through bevel gears 195 to the frame of another self-synchronous transmitter 196 so that the stator winding 197 of the latter may, in effect, be turned with respect to its three phase rotor winding 198. Winding 198 is electrically interconnected with the rotor winding 199 of self-synchronous transmitter 145. A directional gyroscope 301 maintains the rotor 198 substantially stabilized in azimuth about an axis which may be defined as the aircraft azimuth axis. The stator winding 197 of transmitter 196 feeds a follow-up amplifier 302 similar to amplifier 183. The alternating current source 176 excites the stator winding 303 of transmitter 145 and also supplies a reference voltage to the amplifier 302. Amplifier 302, connected in a manner corresponding to amplifier 183, energizes a center-tapped field winding 305 of a direct current generator 306, whose armature 307 is driven through a shaft 308 by a motor 309. It is to be understood that a single motor may drive both generators 186 and 306. The output of generator 306 serves as a voltage source for the azimuth servo motor 144 whose field may be separately excited.

The trail-altitude knob 311 actuates a sliding contact 312 on a potentiometer 313 whose resistance is connected across the output of a balanced rectifier 314. The balanced rectifier 314, well known to those skilled in the art, rectifies the alternating voltage induced across leads 315 and 316 of the rotor winding 193 and the alternating voltage developed across leads 316 and 317 of the same winding, bucking the resultant two direct voltages against each other. The rotor winding 166 of self-synchronous transmitter 165 feeds a similar balanced rectifier 318. The single phase rotor winding 169 of transmitter 172 controlled from sighting angle knob 173 supplies the input of a buffer amplifier 319, the output of which energizes shunt-connected stators 321 and 322 of transmitters 164 and 194 respectively. One lead 323 from the output of balanced rectifier 318 connects to one end of the potentiometer 313 while the other side of the rectifier 318 output goes by a lead 324 to the high potential side of the output of an amplifier 325 whose input is supplied by the sweep generator 71 over lead 72. The lead 69 is connected to the sliding contact 312 of the potentiometer 313 and runs to the navigational indicator 43 as shown in Fig. 4. Thus the output circuits of balanced rectifier 318 and amplifier 325 and the tapped portion of the potentiometer 313 are all in series so that their respective voltage outputs add vectorially.

In operation, the sighting angle shaft 167 may be turned to cause the zero line 10 shown in Fig. 4 of the scanner assembly 9 to follow a target. The alternating magnetic field of the stator 174 induces voltages in the branches of the rotor winding 168 according to the angular relationship between the rotor and the stator. Current proportional to these induced voltages flows in corresponding branches of the rotor winding 177, and there is a resultant alternating magnetic field produced in this winding which rotates synchronously with the turning of the rotor 168 on the shaft 167. In the quiescent condition the vector representing the field in winding 177 is perpendicular to the stator winding 179; consequently there is no voltage induced in the stator by the rotor. When the shaft 167 is turned, the magnetic field vector rotates and flux couples with the stator winding 179, inducing a voltage therein. The phase of the induced voltage reverses at the point of zero coupling because the component of the flux inducing the voltage changes direction.

The presence of a pitch with respect to the zero heading of the scanner or azimuth bearing of the sighting line 10 causes the rotor 165 of the transmitter 163 to alter its normal position of zero coupling with the stator 184. The voltage induced in the rotor is substantially proportional to the sine of the pitch angle and reverses phase according to whether the pitch is above or below the horizontal plane. The vectorial sum of the induced voltages in rotor 165 and stator 179 is fed into the amplifier 183. The input to amplifier 183 is there compared with the reference voltage 176 as to phase. The output excites the field winding 185 of the generator 186 with a direct voltage whose magnitude is substantially proportional to the input to the amplifier 183 and whose direction reverses with phase reversal of this input. A power amplification is obtained by using the generator 186 because only the field control need be supplied by electronic means and the motor 189 delivers most of the power. The generator 186, thus controlled, drives the elevation servomotor 128 so that the scanner not only is caused to follow the adjustment of the shaft 167 but also corrects for any pitch thereof. When the scanner is realigned the input to the amplifier 183 is zero, and the elevation servomotor is supplied no power. Thus, the true sighting angle $\theta$ of the scanner with respect to the horizontal plane may be continuously read from a calibrated scale on the knob 173.

In operation the drift angle shaft 192 may be adjusted to maintain the zero heading 10 of the scanner assembly 9 parallel to the course or ground track of the aircraft, the effects of yaw being corrected automatically. Stator winding 303 induces voltages in the branches of rotor winding 199, and therefore a magnetic field is produced in the connected rotor winding 198. Upon turning the stator 197 with respect to the rotor 198 through the drift angle $\alpha$ by the shaft 192, the stator winding is angularly displaced with respect to its normal position of zero coupling with the rotor field. A voltage is induced in the stator 197 and fed to the amplifier 302 which controls the output of the generator 306. The azimuth servo motor 144 thereupon is caused to turn the scanner zero heading through the drift angle $\alpha$ and equilibrium is again achieved because the field vector of winding 198 is rotated to the position of zero coupling with the stator 197.

The directional gyroscope 301 which positions the rotor 198 is caged when not in use along the longitudinal axis of the aircraft. It is uncaged at the beginning of a bombing approach and thereafter retains its direction in space independent of the aircraft. The gyro axis lies on the heading of the aircraft at the moment of uncaging. Since the rotor 198 is stabilized on the aircraft azimuth axis the presence of yaw causes the stator 197 to rotate around the rotor and a signal is produced which makes the follow-up system turn the scanner to compensate for this yaw. Thus the scanner zero heading is fixed in space at a predetermined drift angle $\alpha$ from the azimuth axis of the aircraft at the beginning of the approach.

It has been shown that the scanner is stabilized against pitch and yaw motion by use of elevation and azimuth servo systems, respectively. Since it is not mechanically convenient to add another axis of rotation and accompanying servo equipment to the scanner, it is necessary to compensate electrically for the effects of roll on the apparent azimuth angle. Since the apparent width of a remote object is proportional to the azimuth angle which it subtends, it is logical to depict the object on an indicating device of a width proportional to this angle. It will be seen on consideration that:

$$\delta' = \delta + \phi \cos \theta \qquad (4)$$

where $\delta'$ is the true azimuth angle, $\delta$ is the apparent scanner azimuth angle, $\theta$ is the sighting angle measured from the true vertical to the object, and $\phi$ is the roll angle measured about the horizontal projection of the line of sight. Now $\sin \phi$ is within one per cent of $\phi$ for angles less than 14 degrees, which roll angle is virtually never exceeded when the aircraft is controlled by the automatic pilot. Therefore Equation 4 may be expressed as:

$$\delta' = \delta + \sin \phi \cos \theta \qquad (5)$$

Recalling Equation 2 expressing the angle subtended by the cross trail from the release point and adding Equations 2 and 5 we have:

$$\delta'' = \delta' + \beta \qquad (6)$$

or $$\delta'' = \delta + \sin \phi \cos \theta + \frac{T}{h} \sin \alpha \cos \theta' \qquad (7)$$

where $\delta''$ is the azimuth angle corrected for roll and cross trail.

The method of obtaining the above-mentioned corrections to the azimuth angle in terms of voltages will now be discussed. The rotor 169 mounted on sighting angle shaft 167 is so aligned with respect to its stator 175 that the voltage induced in the former is proportional to the cosine of the sighting angle or $\cos \theta$. This alternating voltage is amplified in the buffer amplifier 319 and the output energizes stators 321 and 322. The coupling of rotor 166 to stator 321 is proportional to the sine of the roll angle or $\sin \phi$, and therefore the direct current output of rectifier 318 is proportional to both the stator field and the coupling or to $\sin \phi \cos \theta$. The coupling of rotor 193 to stator 322 is proportional to the sine of the drift angle or $\sin \alpha$ and the coupled voltage is applied by leads 315, 316, and 317 to the balanced rectifier 314, the direct current output of which is therefore proportional to $\sin \alpha \cos \theta$. This latter signal is impressed on the potentiometer 313 which taps off a voltage proportional to the trail divided by the altitude or $T/h$. The sweep generator 71 may for convenience produce a sinusoidal wave rather than a saw-toothed voltage proportional to the apparent azimuth angle or $\delta$, without affecting bombing accuracy. The generator 71 produces a complete cycle of sweep voltage for each reflector employed. The phase is adjusted so that the voltage is passing through its zero point in a positive direction at the moment a reflector points along the sighting line 10 of Fig. 4. The amplifier 325 raises the magnitude of the sweep voltage and the two direct voltage corrections generated in the rectifiers 314 and 318 are added in the output circuit in series by leads 323 and 324.

The effect of the correcting voltages is to shift the zero point of the sweep voltage to the right or left of the sighting line 10 and thus alter the position of the image of the target on the indicator screen. Without correction the image would move across the screens an amount proportional to the roll angle multiplied by the cosine of the sighting angle. The proportionality constant of the roll correcting voltage is so chosen with respect to the sweep voltage that no apparent shift of the image occurs with limited roll about the sighting line. The proportionality constant of the cross trail factor is likewise so chosen that an aircraft previously aligned on the target must turn through an azimuth angle equal to that momentarily subtended by the cross trail in order to bring the image of the target back on the azimuth reference trace. It seems evident that when the aircraft reaches the range angle θ' the cross trail will be correctly taken into account.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Scanning apparatus mountable on a movable craft comprising a directive radiator, means for turning said radiator about an azimuth axis, means for producing a directional signal in dependence upon the turning of said radiator about said azimuth axis, means for angularly adjusting said radiator about an elevation axis substantially perpendicular to said azimuth axis, and computing means for adding to said directional signal a corrective signal dependent upon the angular adjustment of said radiator about said elevation axis and angular displacement of said radiator about a third roll axis substantially perpendicular to said elevation and azimuth axes whereby the algebraic sum of said signals is representative of the direction of said radiator about a space stabilized reference axis.

2. Scanning apparatus mountable on a movable craft comprising a directive radiator, means for turning said radiator about a scanning axis, means for producing a directional signal having an amplitude varying with the varying angle between the direction of said radiator and a reference direction, means for angularly adjusting said radiator about a second axis substantially perpendicular to said scanning axis, and computing means for adding to said directional signal a corrective signal having an amplitude substantially proportional to the product of the angular adjustment of said radiator about said second axis and angular displacement of said radiator about a third roll axis substantially perpendicular to said second axis whereby the algebraic sum of said signals is representative of the direction of said radiator about a space stabilized reference axis.

3. Scanning apparatus mountable on a movable craft comprising a directive radiator having a pitch axis and a sighting line substantially perpendicular thereto, means for turning said radiator about an azimuth axis substantially perpendicular to said pitch axis, means for producing a directional signal in dependence upon the turning of said radiator about said azimuth axis, indicator means responsive to said directional signal for providing an azimuth indication of a target relative to said sighting line, means for angularly adjusting said radiator about said pitch axis for changing the pitch of said radiator in accordance with a sighting angle from said radiator to a selected target, and a computer for adding to said directional signal a corrective signal dependent upon the pitch angle of said radiator and angular displacement of said radiator about a roll axis substantially perpendicular to said pitch axis whereby the algebraic sum of said signals is representative of the direction of said radiator about a space stabilized vertical axis, thusly correcting the azimuth indication for roll.

4. Scanning apparatus mountable on a movable craft comprising a directive radiator, means for turning said radiator about a scanning axis, means for producing a directional signal having an amplitude varying with the varying angle between the direction of said radiator and a reference direction, means for angularly adjusting said radiator about a pitch axis substantially perpendicular to said scanning axis, and computing means for adding to said directional signal a corrective signal having an amplitude substantially proportional to the pitch angle of said radiator and angular displacement of said radiator about a roll axis substantially perpendicular to said pitch axis whereby the algebraic sum of said signals is representative of the direction of said radiator about a space stabilized vertical azimuth axis.

5. Scanning apparatus mountable on a movable craft comprising a directive radiator, means for turning said radiator about a scanning axis, means for producing a directional signal having an amplitude varying with varying scanning angle, and gyroscope computer means for adding to said directional signal a corrective signal having an amplitude substantially proportional to the product of an angle measured about a second axis substantially perpendicular to said scanning axis and angular displacement of said radiator about a third axis substantially perpendicular to said second axis whereby the algebraic sum of said signals is representative of the direction of said radiator about a space stabilized reference axis.

6. Radio apparatus mountable on a movable craft comprising a radiator having a directivity pattern for directionally receiving radio waves from a remote object, mounting means for pivotally supporting said radiator about a first axis and about a second axis substantially perpendicular to said first axis, an indicator responsive to said radio waves for representing said object by an image, means for generating a positional signal dependent upon the angle between said directivity pattern and said second axis, means for positioning said image in response to said positional signal, and compensating means for adding to said positional signal an error signal having an amplitude dependent upon angular adjustment of said radiator about said second axis and angular displacement of said mounting means about a third axis substantially perpendicular to said first and second axes, whereby movement of said image tending to result from said angular displacement is substantially neutralized.

7. In radio apparatus adapted to align the ground track of an aircraft relative to a target for bombing purposes, a radiator having a directivity pattern for directionally receiving radio waves from the target, mounting means for pivotally supporting said radiator about a generally vertical first axis and about a second axis substantially perpendicular to said first axis, means for angularly adjusting said radiator about said first and second axes to direct said directivity pattern at the target, an indicator responsive to said radio waves for representing the target by an image, means generating a positional signal dependent upon the angle between said directivity pattern and said second axis for positioning said image, and compensating means for adding to said positional signal a correction signal having an amplitude dependent upon the angular adjustment of said radiator about said first and second axes, whereby maneuvering of the aircraft to track said image causes the ground track of the aircraft to be displaced from the target sufficiently to compensate for the effect of cross trail.

8. In a radio apparatus adapted to align the ground track of an aircraft relative to a target for bombing purposes, a receiving antenna having a receptivity pattern for directionally receiving radio waves from the target, mounting means for pivotally supporting said antenna about two substantially perpendicular axes, means for angularly adjusting said antenna about said axes to direct said receptivity pattern at the target, an indicator responsive to said radio waves for representing the target by an image, means generating a positional signal dependent upon the angle between said receptivity pattern and one of said axes for positioning said image, and compensating means for adding to said positional signal a correction signal having an amplitude related to the extent of angular adjustment of said antenna about said axes, whereby said target image is displaced from its normal position by an amount corresponding to the angle subtended by the cross trail distance.

9. In radio apparatus adapted to align the ground track of an aircraft relative to a target for bombing purposes, a receiving antenna having a receptivity pattern for directionally receiving radio waves from the target, mounting means for pivotally supporting said antenna about a generally vertical first axis and about a generally horizontal second axis, means for angularly adjusting said antenna about said axes to direct said receptivity pattern at the target, an indicator responsive to said radio waves for representing the target by an image, means for generating a positional signal depending upon the angle between said receptivity pattern and said second axis for positioning said image, and compensating means for adding to said positional signal a correction signal having an amplitude proportional to the extent of angular adjustment of said antenna about said axes, whereby said target image is displaced from its normal position by an amount corresponding to the angle subtended by the cross trail distance.

10. In radio apparatus adapted to align the ground track of an aircraft relative to a target for bombing purposes, a directive radiator, means for turning said radiator about a scanning axis, means for producing a directional signal varying with the varying angle between the direction of said radiator and a reference direction, means for angularly adjusting said radiator about an elevation axis substantially perpendicular to said scanning axis, means for angularly adjusting said elevation axis about an azimuth axis substantially perpendicular thereto, and compensating means for adding to said directional signal a correction signal having an amplitude functionally related to the extent of angular adjustment of said radiator about said elevation and azimuth axes, to compensate for roll error.

11. A bombsight comprising a radio system of the type wherein signals are collected from remote objects by a directivity receiving pattern which is orientatable about two mutually perpendicular axes, and wherein images are produced from the signals and positioned on an indicating screen in accordance with the angle between the directivity pattern and one of said axes, stabilizing means adapted to substantially neutralize movements of the images resulting from angular displacements of the pattern caused by rotational movements of the craft about a third roll axis substantially perpendicular to said first two axes, said stabilizing means comprising a gyroscopic reference and a rotatable transformer connected to said gyroscope and arranged to generate a voltage proportional to the roll angle of the craft.

12. A radar system for aircraft comprising an antenna having an azimuth axis, a pitch axis and a stabilized sighting line substantially perpendicular to said pitch axis, said antenna comprising means for receiving radio waves from a target, a directional indicator coupled to said antenna for providing indications of target range relative to said antenna and target azimuth relative to said sighting line, stabilizing means coupled to said antenna for compensating said antenna against changes about said pitch and azimuth axes, means coupled to said stabilizing means for regulating said antenna about its azimuth axis for compensating for aircraft drift angle, further means coupled to said stabilizing means for providing a voltage which is a function of antenna roll about an axis perpendicular to said azimuth and pitch axes, and compensating means coupled to said roll voltage producing means and said drift angle compensating means for providing an output voltage signal which is a function of antenna roll and a function of cross trail for a selected target to be bombed from the aircraft, said compensating means being coupled to said indicator for supplying said voltage signal thereto for regulating target azimuth indications in accordance therewith.

References Cited in the file of this patent
UNITED STATES PATENTS

| | | |
|---|---|---|
| 1,384,868 | Sperry | July 19, 1921 |
| 1,864,638 | Chilowsky | June 28, 1932 |
| 1,892,431 | Hammond | Dec. 27, 1932 |
| 2,231,929 | Lyman | Feb. 18, 1941 |
| 2,407,697 | Williams | Sept. 17, 1946 |
| 2,412,612 | Godet | Dec. 17, 1946 |